United States Patent [19]

Wilson

[11] Patent Number: 5,277,362
[45] Date of Patent: Jan. 11, 1994

[54] REUSABLE ENVELOPE

[76] Inventor: Scott L. Wilson, 808 Tree Trunk Rd., Knoxville, Tenn. 37922

[21] Appl. No.: 947,432

[22] Filed: Sep. 21, 1992

[51] Int. Cl.⁵ .............................................. B65D 27/06
[52] U.S. Cl. .................................. 229/305; 229/304
[58] Field of Search .............. 229/300, 301, 302, 303, 229/304, 305

[56] References Cited

U.S. PATENT DOCUMENTS

| | | | |
|---|---|---|---|
| 174,940 | 3/1876 | Brown | 229/305 X |
| 380,616 | 4/1888 | Bobrick | 229/300 X |
| 2,681,175 | 6/1954 | David | 229/304 X |
| 2,840,295 | 6/1958 | Fromm | 229/300 X |
| 2,858,061 | 10/1958 | Fromm et al. | 229/70 |
| 2,941,711 | 6/1960 | Biek | 229/303 |
| 3,062,431 | 11/1962 | Rabenold | 229/303 |
| 3,380,648 | 4/1968 | Lyra | 229/303 X |
| 3,472,444 | 10/1969 | Aliff, Jr. et al. | 229/70 |
| 3,747,837 | 7/1973 | Wilson | 229/303 |
| 5,025,980 | 6/1991 | Blackman | 229/302 |

Primary Examiner—Allan N. Shoap
Assistant Examiner—Jes F. Pascua
Attorney, Agent, or Firm—Pitts & Brittian

[57] ABSTRACT

A reusable envelope (10) for the delivery of mail and the return delivery of a response. The reusable envelope (10) includes a single sheet (12) of a selected material with various folds to achieve an envelope similar to a standard envelope. A front panel (14) is defined at a central portion of the sheet. A first wing portion (28) and a back portion (32) are folded and secured to one another. A top flap portion (52) extends from the front panel (14) and may be folded toward the back portion (32) to facilitate sealing the reusable envelope (10) for original delivery. A second wing portion (40) extends from the back portion (32) and is folded and removably secured to a portion of the front panel (14). An opening (20) is revealed for the withdrawal and placement of selected articles to be delivered upon removal of the second wing portion (40). A sealing flap (46) is provided for sealing the opening (20) for return delivery of the reusable envelope (10). Windows may be provided at selected locations along the front panel (14) and second wing portion (40) to facilitate the viewing of sending and/or return addresses printed upon the contents within the reusable envelope (10).

10 Claims, 4 Drawing Sheets

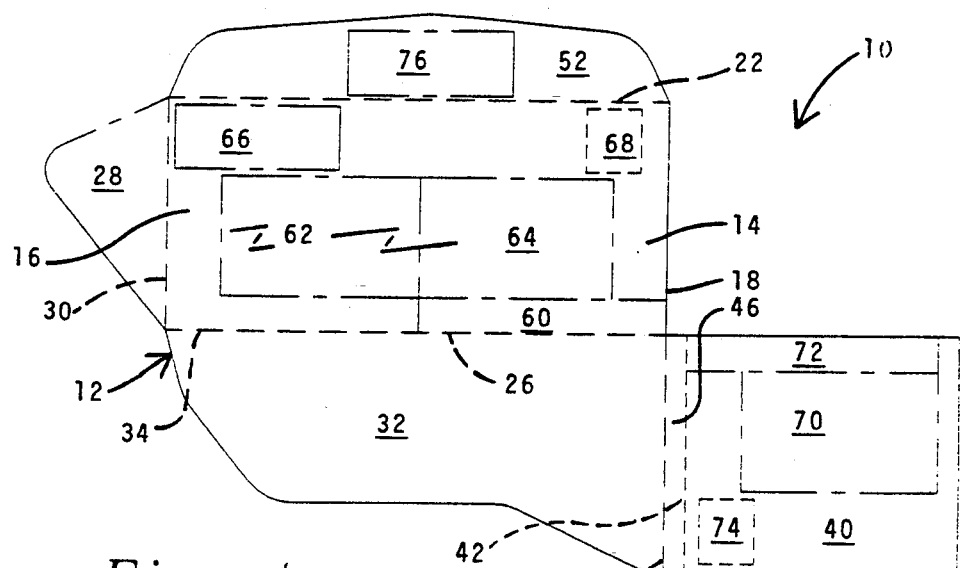
Fig. 1
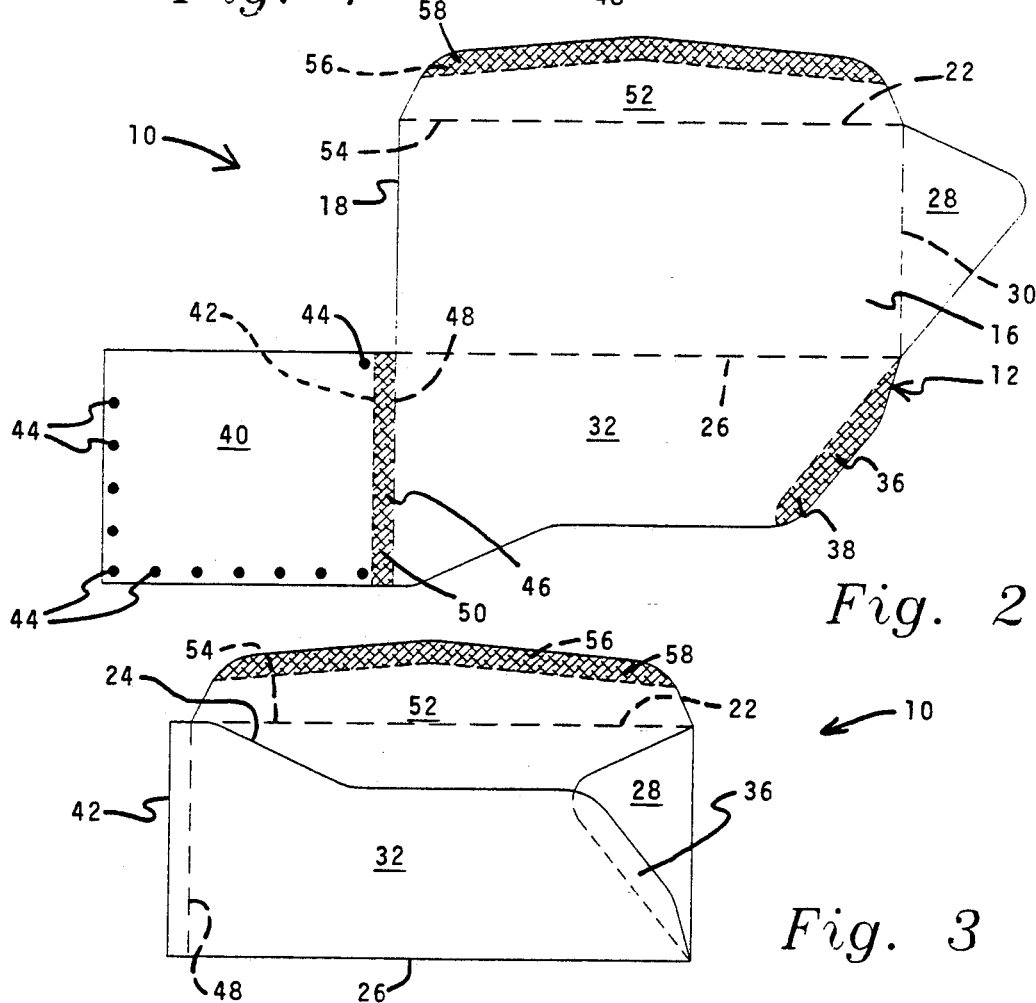
Fig. 2
Fig. 3

REUSABLE ENVELOPE

TECHNICAL FIELD

This invention relates to the field of envelopes. More specifically, this invention relates to an envelope which may be used for the delivery of a statement, bill, or other selected correspondence, and then as a return envelope to make a reply to the original mailing.

BACKGROUND ART

It is well known that creditors, utility companies, and other such entities periodically send statements through the mail in order to notify the debtor, customer, or otherwise of an amount due. The statements may be printed by high impact printers, in which case the form may be of the continuous feed type with internally positioned carbon paper, or the statement may be printed otherwise and stuffed into an envelope. In either case, it is well known that a return envelope is typically enclosed along with the statement in which the statement is to be returned.

The return envelope is typically imprinted with the address of the original sender, or it may define a window through which a portion of the statement may be viewed. That portion of the statement visible through the window will normally have the address printed thereon. The address, whether on the statement or on the envelope, may include not only the typed alpha-numeric address, but may also include a bar-code equivalent of a portion of the address sufficient for optical character readers such as those utilized by the United States Postal Service for more efficient mail handling. When not included on the address portion of an envelope by the sender, a bar-code is printed on the envelope either by manual operator control, or by optical character recognition equipment.

It is well known that when such a statement is received, the outer envelope is typically removed and discarded. A goal of many people today is to reduce the amount of waste produced. It is well known that the number of envelopes thrown away in instances such as that described is numerous. In consideration of the goal to reduce waste, it is therefore desirable to reduce the amount of envelopes used and thrown away.

Many marketing companies utilize mail such as monthly statements from power and phone companies to its fullest advantage by stuffing the envelopes with advertisements. This practice is typically not accomplished with mailings which are printed on continuous forms. Therefore it is profitable to use the envelopes in which the statement, reply envelope, and any other selected material may be inserted as selected.

Other envelopes have been produced to serve various functions. Typical of the art are those devices disclosed in the following U S. Patents:

| U.S. Pat. No. | Inventor | Issue Date |
| --- | --- | --- |
| 174,940 | H. E. Brown | Mar. 21, 1876 |
| 1,335,814 | J. C. Blue | Apr. 6, 1920 |
| 1,371,670 | R. Dority, et al. | Mar. 15, 1921 |
| 1,401,324 | R. Dority, et al. | Dec. 27, 1921 |
| 2,383,652 | C. A. Holmblad, et al. | Aug. 28, 1945 |
| 3,111,257 | J. R. Peach | Nov. 19, 1963 |

The envelope disclosed by Brown in the '940 patent includes an extra back on which the intended recipient's address is printed. A corner is cut away from the extra back to reveal the postage stamp which is cancelled. In the event the mail is unclaimed, the extra back is removed to reveal the sender's address so that the mail may be returned. The cancelled postage is not removed, but is intentionally left in place as proof of postage such that the envelope may be returned.

The '814 patent issued to Blue discloses an envelope that may be readily opened by the postal inspector without destruction of the envelope. Such an envelope would not be of useful value today as such mail is required to be as completely sealed as possible in order to prevent tampering and further as evidence of any such tampering.

The '670 patent issued to Dority discloses an envelope of a size to receive a return envelope and a statement. The outer envelope defines a window through which the addressee's name appears as it is typed on the statement. This is the arrangement that is now trying to be avoided as it demands the disposal of the outer envelope when the statement is received.

The '324 patent issued to Dority discloses an envelope on which the statement is printed and then which is used as a return envelope. As in the '670 patent issued to Dority, the return envelope is inserted into an outer envelope which is disposed of on receipt.

Holmblad, in the '652 patent, discloses an envelope and insert which have registered openings through which a sealing strip may be received. Postage may be affixed to the sealing strip. When the sealing strip is removed, the insert may be removed, refolded, and reinserted for return mailing. There are no provisions for completely sealing the contents of the envelope, nor for the placement of selected advertisements within the envelope.

The envelope disclosed by Peach in the '257 patent is used for both delivery of a statement and return of payment. However, there are no provisions for the removal of any printing on the exterior of the envelope. Provision is made only for the hiding of material along the top edge of the envelope including the original return address and postage. Anything outside the top area, such as a printed bar code or other information, would not be removed or hidden, and would thus render the envelope unusable for return mail.

Therefore, it is an object of this invention to provide a means for reusing an envelope which has been delivered with a statement which must be answered through the post.

It is also an object of the present invention to provide a reusable envelope which provides a means for removing any indicia pertinent only to the original mailing of the envelope, including the cancelled postage and the original recipient's address, including any associated bar code, printed on the face of the envelope.

It is further an object of the present invention to provide such an envelope which creates a minimal amount of waste product during and after use.

Another object of the present invention is to provide an envelope which may be used to insert advertisement within as selected by the sender of the envelope.

Still another object of the present invention is to provide a means for substantially sealing the contents within the envelope during both the original and return mailings.

DISCLOSURE OF THE INVENTION

Other objects and advantages will be accomplished by the present invention which allows for the reuse of an envelope for a reply to the original mailing within the envelope. The reusable envelope is designed such that a portion may be removed after the original delivery, that portion bearing cancelled postage and information pertinent only to the original delivery.

The reusable envelope is preferably constructed from a single sheet of a selected material. Various folds are made to achieve an envelope similar to a standard envelope. A front panel is defined at a central portion of the sheet. A first wing portion extends from one end of the front panel and is folded toward the rearward face. A back portion extends downwardly from the front panel and is folded toward the rearward face in similar fashion to the first wing portion. A selected adhesive is applied within an overlap region defined by the first wing portion and the back portion to secure each to the other.

A second wing portion extends from the back portion in an opposing direction from the first wing portion such that when the back portion is secured to the first wing portion, the second wing portion is positioned to be folded over the second end of the reusable envelope to cover a portion of the front panel. The second wing portion is removably secured to the front panel in a selected fashion. When the second wing portion is removed from the reusable envelope, an opening is revealed for the withdrawal and placement of selected articles to be delivered. To facilitate the sealing of the opening in order for return mailing, a flap portion is provided and extends between the back portion and the second wing portion. A selected adhesive is provided for securing the flap portion to the front panel, thus sealing the opening.

A top flap portion extends from the front panel and may be folded toward the back portion. The top flap is dimensioned to overlap the back and first wing portions when so folded. To facilitate sealing of the reusable envelope, the top flap is provided with a selected adhesive in the overlap region.

An address region, a return address region, a bar code region, and a postage region are defined on the front panel of the reusable envelope. The second wing portion defines a portion of the address region, and also the bar code region and the postage region. The second wing portion is dimensioned such that when secured to the front panel of the reusable envelope, a corresponding portion of the address region defined by the front panel, the bar code region defined by the front panel, and the postage region defined by the front panel are each covered. Thus the original address may be placed on the second wing portion, along with postage and a bar code, and then removed when received, thus revealing new address, bar code and postage regions.

Windows may be provided at selected locations along the front panel and second wing portions to facilitate the viewing of sending and/or return addresses printed upon the contents within the reusable envelope.

BRIEF DESCRIPTION OF THE DRAWINGS

The above mentioned features of the invention will become more clearly understood from the following detailed description of the invention read together with the drawings in which:

FIG. 1 is a plan view of a preferred embodiment reusable envelope constructed in accordance with several features of the present invention showing the outer faces thereof;

FIG. 2 is a plan view of the reusable envelope illustrated in FIG. 1 showing the inner faces thereof;

FIG. 3 is bottom plan view of the reusable envelope of FIG. 1 showing the envelope folded with the exception of the top flap for the insertion of mail;

BEST MODE FOR CARRYING OUT THE INVENTION

Figure 4A:
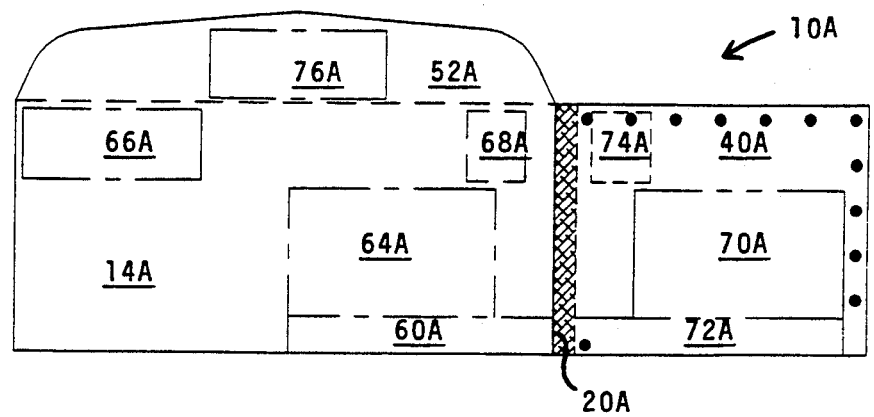
FIG. 4A is a top plan view of the embodiment shown in FIG. 1 showing both flaps open.

A reusable envelope incorporating various features of the present invention is illustrated generally at 10 in the figures. The reusable envelope 10 is designed for the delivery of mail from a first party to a second party, and then for the delivery of a reply from the second party to the first. The reusable envelope 10 is designed such that a portion may be removed after the original delivery, that portion bearing cancelled postage and information pertinent only to the original delivery. Upon removal of that portion of the envelope, an opening is revealed for the removal of the material within and for the insertion of the response. Means are provided for resealing the envelope in preparation for the return delivery.

As shown in FIGS. 1 and 2, the reusable envelope 10 is constructed from a single sheet 12 of a selected material. Various folds are made to achieve an envelope similar to a standard envelope. A front panel 14 defines a substantial rectangle. As shown by broken lines, various regions are defined upon the front panel 14. The various purposes of these regions are to be described in greater detail below.

A first wing portion 28 extends from one end 16 of the front panel 14 and is folded toward the rearward face along relief line 30. A back portion 32 extends downwardly from the front panel 14 and is folded toward the rearward face along relief line 34 in similar fashion to the first wing portion 28. When the first wing portion 28 and back portion 32 are folded in this manner, the back portion 32 will overlap the first wing portion 28 (see FIG. 3). As shown in FIG. 2, there is a selected adhesive 38 applied within the overlap region 36 to secure the back and first wing portions 32,28 to each other, thus sealing the first end 16 and the bottom 26 of the reusable envelope 10. It will be understood that the first wing portion 28 could overlap the back portion 32 in similar fashion to achieve the same effect.

A second wing portion 40 extends from the back portion 32 in an opposing direction from the first wing portion 28. When the back portion 32 is secured to the first wing portion 28 as described, the second wing portion 40 is positioned to be folded over the second end 18 of the reusable envelope along relief line 42 to cover a portion of the front panel 14. The second wing portion 40 is removably secured to the front panel 14 in a selected fashion. As illustrated, the second wing portion 40 may be so secured using spots of a selected adhesive 44. In order to facilitate removal of the second wing portion 40 completely from the reusable envelope 10, the relief line 42 may be perforated.

Figure 9:
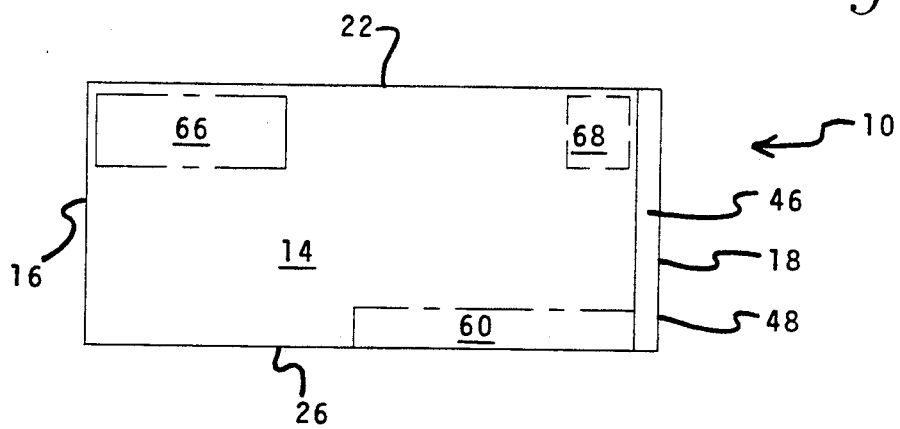
FIG. 9 is a top plan view of an embodiment of the present invention showing the second wing member removed and the envelope prepared for return mailing.

When the second wing portion 40 is removed from the reusable envelope 10, an opening 20 is revealed in the second end 18 thereof. Articles within the envelope 10 may be withdrawn through this opening 20, and articles may be replaced in similar fashion. Prior to mailing, the opening 20 must be resealed. To facilitate the sealing of the opening 20, a flap portion 46 is provided and extends between the back portion 32 and the second wing portion 40. The flap portion 46 may include a stub portion of the second wing portion 40 which remains attached to the back portion 32 after removal of the second wing portion 40. The flap portion 46 may be folded along relief line 48 to engage a portion of the front panel 14 (see FIG. 9). A selected adhesive 50 is provided for securing the flap portion 46 to the front panel 14, thus sealing the opening 20. Typical adhesives 50 include moistenable glue and adhesive transfer tape.

It will be understood, though not shown, that the second wing portion 40 may be folded along the relief line 48 in order to accomplish the initial sealing of the reusable envelope 10, as opposed to relief line 42 as previously described. Further, it is conceivable that the second wing portion 14 may be selectively and removably secured to the front panel 14 by the original sender, the original insert being inserted through the opening 20 defined at the second end 18 prior to such selective and removable securement. Thus, the need for the opening 24 proximate the top 22 of the envelope 10 may be obviated.

A top flap portion 52 extends from the front panel 14 and may be folded along relief line 54 toward the back portion 32. The top flap 52 is dimensioned to overlap the back and first wing portions 32,28 when so folded. To facilitate sealing of the reusable envelope 10, the top flap 52 is provided with a selected adhesive 58 in the overlap region 56. Thus, the reusable envelope 10 may be stuffed and sealed originally in a manner substantially similar to that of a standard envelope.

Referring to FIG. 1, several regions are defined upon the front panel 14, the second wing portion 40, and the top flap 52. The United States Postal Service (USPS) has defined particular regions for more efficient delivery of the mail. Particularly enhanced is the ability to utilize optical character recognition (OCR) equipment in order to determine the destination of the mail and imprint a bar code. If a bar code has been included as a portion of the mailing address by the original sender, the bar code may be detected and read by a bar code scanner. After the selected piece of mail has been imprinted with a selected bar code, minimal amount of manual handling is required to deliver the mail to its final destination. At the present time the USPS is encouraging senders, especially those with mass mailings, to include at least the zip code in bar code form. To this end, the USPS offers discounts to those who participate, the discounts deriving from the savings in handling.

As shown in FIG. 1, an address region 62, a return address region 66, a bar code region 60, and a postage region 68 are defined on the front panel 14 of the reusable envelope 10. Though the USPS standards are not to limit the areas defined by the reusable envelope 10 of the present invention, a discussion is given as exemplary of one embodiment.

The address region 62 is defined by the USPS as that area no higher than $2\frac{3}{4}''$ (two and three-quarters inches) from the bottom edge 26, no less than $\frac{5}{8}''$ (five-eighths inches) from the bottom edge 26, and no less than $1''$ (one inch) from either of the side edges 16,18 of the envelope 10. The current OCR equipment is capable of reading characters up to $2\frac{1}{4}''$ (two and one-quarter inches) from the bottom edge 26 of the envelope 10. The greater defined region is similar to that depicted at 62.

The return address region 66 is defined by the USPS as that area above $2\frac{3}{4}''$ (two and three-quarters inches) from the bottom edge 26 of the envelope 10. The return address region 66 is typically maintained in the upper left-hand corner of the envelope 10. An additional return address region is shown at 76 located on the top flap 52. The additional return address region 76 may be used by the original addressee when returning the envelope 10 to the original sender, as the original sender's name and address may be printed in the return address region 66 on the front panel 14 prior to the original mailing.

A bar code region 60 is defined by the USPS at the region in the lower right-hand corner of the front panel 14 having a width of at least $4\frac{1}{2}''$ (four and one-half inches) and a height of at lest $\frac{5}{8}''$ (five-eighths inches). If the OCR equipment does not detect a bar code present on the face of the envelope 10, one will be placed within the bar code region 60. It is not required, however, that the bar code be placed within this region 60 by the sender.

It is standard practice to place the required postage in the upper right-hand corner as depicted by 68. The area required for the cancellation of the postage is larger than that required for the postage alone, which is another reason for limiting the area for the return address to the upper left-hand corner of the front panel 14.

Again, it is not intended to limit the sizes of the reusable envelope 10 and these regions thereon to the sizes described. These dimensions are merely representative of the current USPS requirements. It is understood that these dimensions may change as equipment changes, and it is further understood that differing applications of the same or similar technology may further alter the required configuration of the reusable envelope 10.

The second wing portion 40 defines at least a portion of the address region 70, as well as a bar code region 72 and a postage region 74. The second wing portion 40 is dimensioned such that when secured to the front panel 14 of the reusable envelope 10, a corresponding portion of the address region 64 defined by the front panel 14, the bar code region 60 defined by the front panel 14, and the postage region 68 defined by the front panel 14 are each covered. Thus the original address may be placed on the second wing portion 40, along with postage and a bar code, and then removed when received, thus revealing new address, bar code and postage regions 64,60,68.

In the event the bar code is placed along with the address by the original sender, the bar code region 72 of the second wing portion 40 will be unaffected by the USPS. However, if no bar code is included by the original sender, the USPS will place one in the region 72, all of which may be removed by removal of the second wing portion 40.

The sender may choose to pre-print the appropriate bar code on the front panel 14 of the envelope 10 prior to affixing the second wing portion 40, thereby allowing for more efficient return delivery of the mail. This bar code could be placed at any point on the front panel 14 which is readable by the OCR equipment, but preferably completely concealed by the second wing portion 40 in order to prevent confusion in the original mailing.

As shown in the figures, spot glue 44 is one preferred method of securing the second wing portion 40 to the front panel 14. This method is used to facilitate easy opening. However, spots may be left where the glue has been used, thereby causing discontinuity in the surface of the front panel 14. Therefore, with this method, it is preferable to limit as much as possible the use of glue which would correspond to the bar code region 60 on the front panel 14. Use of glue or any other material which might damage this region 60 may prohibit effective use of bar code scanners.

FIGS. 4-8 show several preferred embodiments of the present invention. These are merely a few possible embodiments, and description of each is not intended to limit the present invention to them exclusively. It will be understood that many other embodiments or combinations thereof are foreseeable and fall within the scope of the present invention. The figures ending with "A" depict the particular embodiment of the reusable envelope 10 showing the top flap 52 and second wing portions 40 prior to being folded into their respective positions for mailing. The figures denoted with "B" illustrate the respective embodiments with the second wing portions 40 secured to the front panels 14, with the top flaps 52 unfolded such that mail may be placed within. The elements of the various embodiments are denoted with suffixes "A" through "E". Like elements are labeled with like numeric values.

Figure 4B:
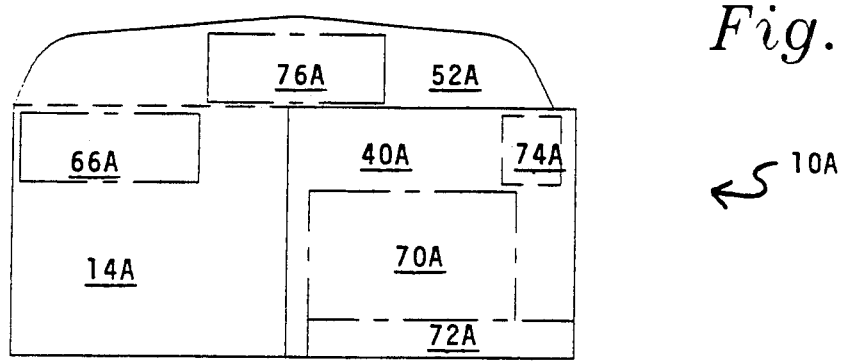
FIG. 4B is a top plan view of the embodiment shown in FIG. 4A showing the envelope folded with the exception of the top flap for the insertion of mail.

FIGS. 4A and 4B illustrates a preferred embodiment of the reusable envelope 10A of the present invention wherein the front panel 14A and second wing portion 40A are continuous. The original sender's name, address, and bar code may be pre-printed on the front panel 14A in the region covered by the second wing portion 40A. The original recipient's name, address, and bar code may be printed on the second wing portion 40A. The return address portion 66A may be used to pre-print the original sender's name and address as well. The original recipient is only required to remove the second wing portion 40A, remove the contents from within the envelope 10A make the necessary reply, reseal the envelope 10A in the manner described, affix any appropriate postage required, and deposit the reusable envelope 10A in the mail. The original recipient may elect to place his/her name and address in the return address region 66A on the front panel 14A of the reusable envelop 10A if available, or on the return address portion 76A of the top flap 52A.

Figure 5A:
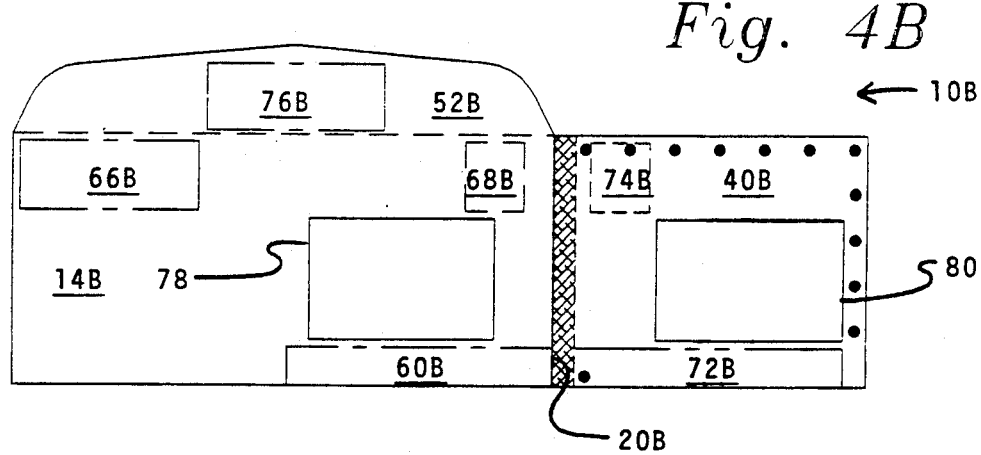
FIG. 5A is a top plan view of an alternate embodiment of the reusable envelope showing both flaps open.
Figure 5B:
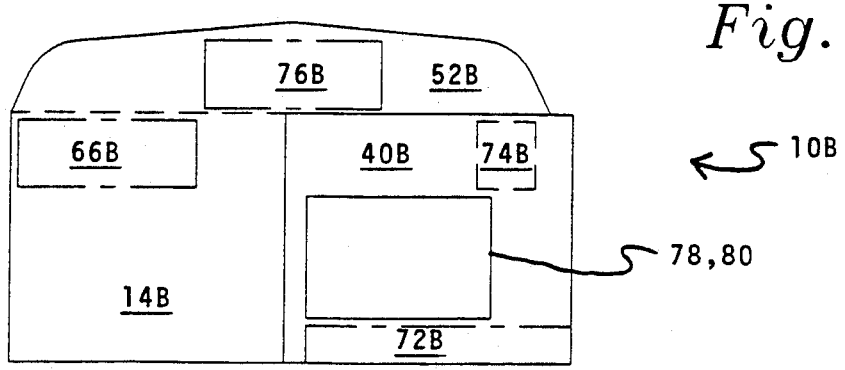
FIG. 5B is a top plan view of the embodiment shown in FIG. 5A showing the envelope folded with the exception of the top flap for the insertion of mail.

FIGS. 5A and 5B illustrate a reusable envelope 10B wherein the front panel 14B and second wing portion 40B define registered openings 78,80, respectively, for the viewing of an address pre-printed on an insert placed within the reusable envelope 10B. Typically, the original sender will pre-print the recipient's address on a portion of the statement to correspond with the registered openings 78,80 when oriented in a first position, and will pre-print the return address on another portion of the statement to correspond with the registered openings 78,80 when oriented in a second position. The registered openings 78,80 are defined within the address region 62B described above. The addresses pre-printed on the statement or other insert may include the appropriate bar code as well. However, the appropriate bar codes may likewise be pre-printed, or printed by the USPS, on the front panel 14B and second wing portions 40B as previously described. The reusable envelope 10B may otherwise be used in similar fashion to the reusable envelope 10A.

Figure 6A:
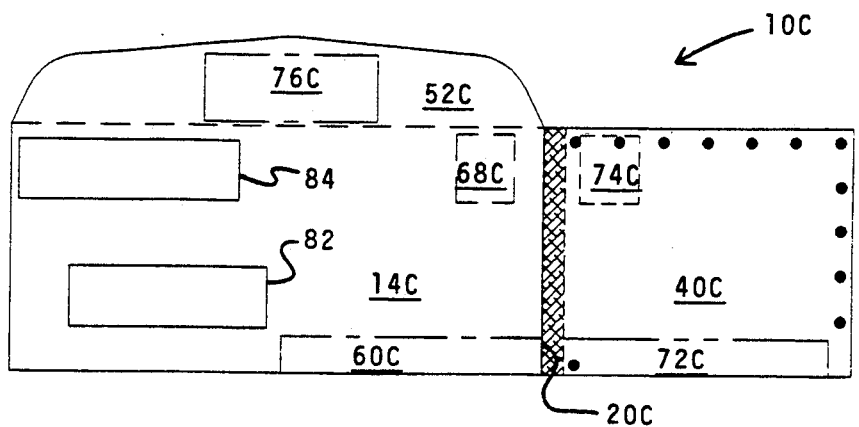
FIG. 6A is a top plan view of an alternate embodiment of the reusable envelope showing both flaps open.
Figure 6B:
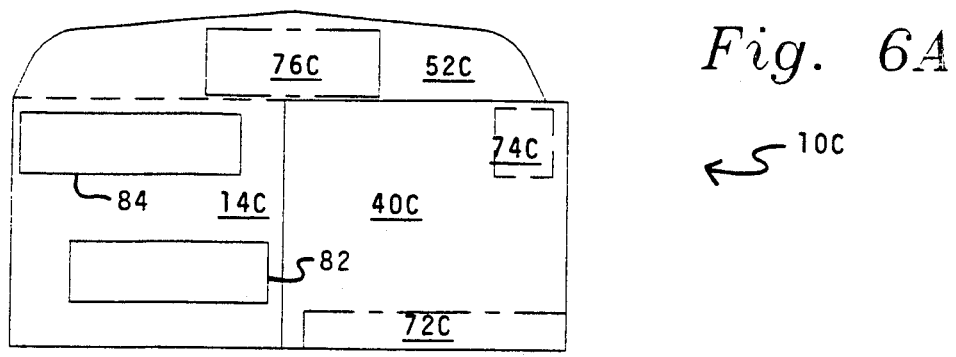
FIG. 6B is a top plan view of the embodiment shown in FIG. 6A showing the envelope folded with the exception of the top flap for the insertion of mail.

FIGS. 6A and 6B illustrate a reusable envelop 10C wherein opening 82 is defined by lo the front panel 14C in a region not covered by the second wing portion 40C. The opening 82 may be used in similar fashion to the reusable envelope 10B as shown in FIGS. 5A and 5B. A return address opening 84 may be defined proximate the return address region 66C described above, while the address opening 82 may be defined within the address region 62C defined above. The second wing portion 40C and the portion of the front panel 14C corresponding with the second wing portion 40C are used primarily for affixing the appropriate postage and for the imprinting of the appropriate bar code. It will be noted that the bar code may alternatively be printed along with the address which may be revealed through the opening 82 defined by the front panel 14C. The reusable envelope 10C would otherwise function similarly to the reusable envelopes 10A,B as previously described.

Figure 7A:
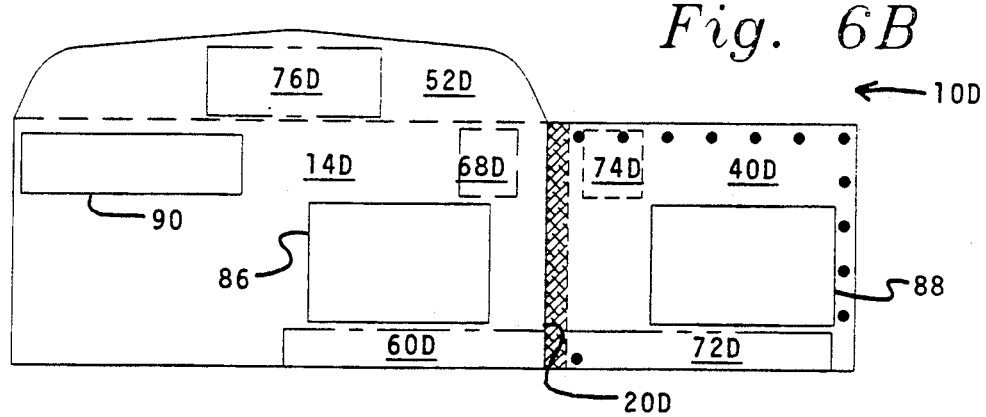
FIG. 7A is a top plan view of an alternate embodiment of the reusable envelope showing both flaps open.
Figure 7B:
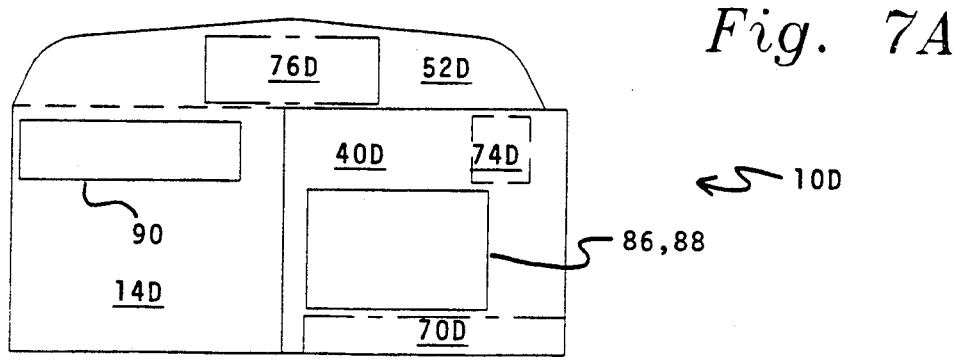
FIG. 7B is a top plan view of the embodiment shown in FIG. 7A showing the envelope folded with the exception of the top flap for the insertion of mail.

FIGS. 7A and 7B illustrate a reusable envelope 10D wherein registered openings 86,88 are defined by the front panel 14D and second wing portion 40D, respectively, in similar fashion to the reusable envelop 10B. Further defined by the front panel 14D is a return address opening 90 as described in the reusable envelope 100. The reusable envelope 10D may be used in similar fashion to the previously described embodiments.

Figure 8A:
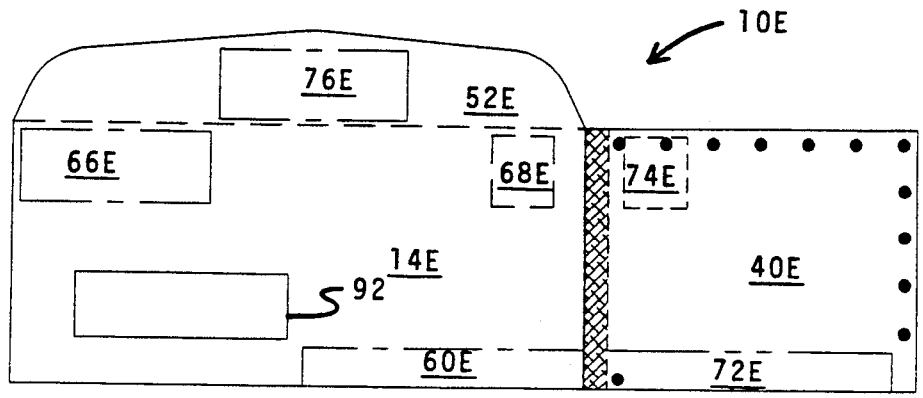
FIG. 8A is a top plan view of an alternate embodiment of the reusable envelope showing both flaps open.
Figure 8B:
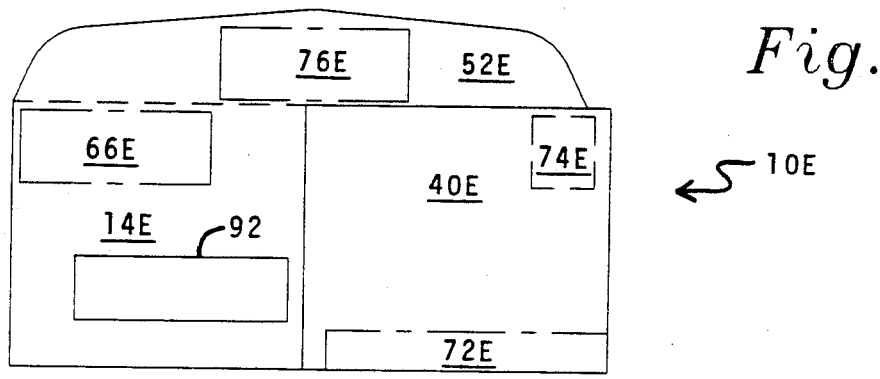
FIG. 8B is a top plan view of the embodiment shown in FIG. 8A showing the envelope folded with the exception of the top flap for the insertion of mail.

FIG. 8A and 8B illustrate a reusable envelope 10E wherein an address opening 92 is defined by the front panel 14E within an area not covered by the second wing portion 40E. The address opening 92 is similar to that defined by the reusable envelope 10C. The address opening 92 may be used to reveal the selected address and, if desired, the appropriate bar code. The reusable envelope 10E may be otherwise used in similar fashion to the previously described embodiments.

From the foregoing description, it will be recognized by those skilled in the art that several preferred embodiments of a reusable envelope offering advantages over the prior art have been provided. Specifically, the reusable envelope provides a means for delivering mail to an original recipient, removing a portion of the reusable envelope upon which is at least the cancelled postage and any bar code printed thereon. Upon removal of the bar code and cancelled postage, an opening is revealed for the withdrawal of the contents and replacement of a reply. The reusable envelope is provided with a means for resealing such that the reusable envelope may then be placed in the mail for return delivery.

The reusable envelope may be implemented for reduction of waste, more accurate return of mail, and for various other beneficial reasons. It is expected that a primary use for the reusable envelope will be for the mailing of statements or bills, and the return mailing of a payment or other appropriate reply.

While several preferred embodiments have been shown and described, it will be understood that they are not intended to limit the disclosure, but rather they are intended to cover all modifications and alternate methods falling within the spirit and the scope of the invention as defined in the appended claims.

Having thus described the aforementioned invention, I claim:

1. An envelope for delivery of mail and for return delivery of a reply, said envelope comprising:

a sheet, said sheet defining at least a front panel, a back portion extending from said front panel, and a first wing portion extending from said front panel, said back portion being folded to coincide with at least a portion of said front panel, said first wing portion being folded to coincide with at least a portion of said front panel, a portion of said first wing portion coinciding with said back portion, said back portion and said first wing portion being secured one to another proximate said portion of said first wing portion to form a back panel dimensioned to coincide with a substantial portion of said front panel, said front panel and said back panel cooperating to define said envelope in which said mail and said reply are selectively received, said sheet defining at least a first opening proximate a first edge defined by said envelope through which said mail and said reply are received and retrieved when said sheet is selectively folded, said front panel defining at least a first region and a second region, said first region for affixing a selected encoding of at least a portion of a return recipient address therein, said second region for affixing appropriate postage for return mailing therein;

a second wing portion extending from said sheet, said second wing portion serving to substantially seal said first opening to prevent unselected removal of said mail and said reply therethrough, said second wing portion being folded over and removably secured to said front panel defined by said sheet, a relief line being defined by said second wing portion proximate said rear panel to facilitate selective removal of said second wing portion, a relief line being defined by said second wing portion proximate said rear panel to facilitate selective removal of said second wing portion, said second wing portion being dimensioned to cover at least said first region and said second region, said second wing portion defining at least a third region and a fourth region, said third region for affixing a selected encoding of at least a portion of an original recipient address therein, said fourth region for affixing appropriate postage for original mailing therein, a substantial portion of said second wing portion being detachable from said receptacle member, said substantial portion of said second wing portion including at least said third region and said fourth region, said substantial portion of said second wing portion being further dimensioned to reveal said first region of said front panel and said second region of said front panel upon removal of said substantial portion of said second wing portion; and a first sealing flap defined by said sheet proximate said first opening for sealing said first opening after said mail has been retrieved and said reply has been received therethrough.

2. The envelope of claim 1 wherein said sheet further defines a second opening proximate a second edge defined by said envelope, said second opening for receiving said mail therethrough, said first opening defined by said receptacle member being used for retrieval of said mail and reception of said reply, said sheet further defining a second sealing flap for substantially sealing said second opening after said mail has been received therethrough.

3. The envelope of claim 1 wherein said second wing portion defines a continuous member, said second wing portion further defining a fifth region within which said original recipient address may be imprinted, said front panel defining a sixth region within which said return recipient address may be imprinted, said second wing portion being further dimensioned to substantially cover said sixth region when said second wing portion is affixed to said front panel.

4. The envelope of claim 1 wherein said second wing portion defines a window, said front panel defining a window in register with said window defined by said second wing portion, said windows being dimensioned to selectively view at least said original recipient address when said mail is received within said envelope and at least said return recipient address when said reply is selectively received within said envelope, said original recipient address being affixed to said mail, said return recipient address being affixed to said reply.

5. The envelope of claim 1 wherein said front panel defines a window, said window being dimensioned to selectively view at least said original recipient address when said mail is received within said envelope and at least said return recipient address when said reply is selectively received within said envelope, said window being unencumbered by said second wing portion when said second wing portion is removably secured to said front panel, said original recipient address being affixed to said mail, said return recipient address being affixed to said reply.

6. An envelope for delivery of mail and for return delivery of a reply, said envelope comprising:

a sheet, said sheet defining at least a front panel, a back portion extending from said front panel, and a first wing portion extending from said front panel, said back portion being folded to coincide with at least a portion of said front panel, said first wing portion being folded to coincide with at least a portion of said front panel, a portion of said first wing portion coinciding with said back portion, said back portion and said first wing portion being secured one to another proximate said portion of said first wing portion to form a back panel dimensioned to coincide with a substantial portion of said front panel, said front panel and said back panel cooperating to define said envelope in which said mail and said reply are selectively received, said sheet defining at least a first opening proximate a first edge defined by said envelope through which said mail and said reply received and retrieved when said sheet is selectively folded, said front panel defining at least a first region and a second region, said first region for affixing a selected encoding of at least a portion of a return recipient address therein, said second region for affixing appropriate postage for return mailing therein, said front panel defining a return address window, said return address window being dimensioned to selectively view a first selected return address when said mail is received within said envelope and at least a second selected return address when said reply is selectively received within said envelope, said first selected return address being affixed to said mail, said second selected return address being affixed to said reply;

a second wing portion extending from said sheet, said second wing portion serving to substantially seal said first opening to prevent unselected removal of said mail and said reply therethrough, said second wing portion being folded over and removably secured to said front panel defined by said sheet, said second wing portion being dimensioned to cover at least said first region and said second region, said second wing portion defining at least a third region and a fourth region, said third region for affixing a selected encoding of at least a portion of an original recipient address therein, said fourth region for affixing appropriate postage for original mailing therein, a substantial portion of said second wing portion being detachable from said receptacle member, said substantial portion of said second wing portion including at least said third region and said fourth region, said substantial portion of said second wing portion being further dimensioned to reveal said first region of said front panel and said second region of said front panel upon removal of said substantial portion of said second wing portion, said second wing portion unencumbering said return address window when said second wing portion is removably secured to said receptacle member; and a first sealing flap defined by said sheet proximate said first opening for sealing said first opening after said mail has been retrieved and said reply has been received therethrough.

7. The envelope of claim 6 wherein said sheet further defines a second opening proximate a second edge defined by said envelope, said second opening for receiving said mail therethrough, said first opening defined by said receptacle member being used for retrieval of said mail and reception of said reply, said sheet further defining a second sealing flap for substantial sealing said second opening after said mail has been received therethrough.

8. The envelope of claim 6 wherein said second wing portion defines a continuous member, said second wing portion further defining a fifth region within which said original recipient address may be imprinted, said front panel defining a sixth region within which said return recipient address may be imprinted, said second wing portion being further dimensioned to substantially cover said sixth region when said second wing portion is affixed to said front panel.

9. The envelope of claim 6 wherein said second wing portion defines a window, said front panel defining a window in register with said window defined by said second wing portion, said windows being dimensioned to selectively view at least said original recipient address when said mail is received within said envelope and at least said return recipient address when said reply is selectively received within said envelope, said original recipient address being affixed to said mail, said return recipient address being affixed to said reply.

10. The envelope of claim 6 wherein said front panel defines a window, said window being dimensioned to selectively view at least said original recipient address when said mail is received within said envelope and at least said return recipient address when said reply is selectively received within said envelope, said window being unencumbered by said second wing portion when said second wing portion is removably secured to said front panel, said original recipient address being affixed to said mail, said return recipient address being affixed to said reply.

* * * * *